US008875506B2

(12) United States Patent
Hennemann et al.

(10) Patent No.: US 8,875,506 B2
(45) Date of Patent: Nov. 4, 2014

(54) WORK VEHICLE LIFTING PERFORMANCE

(75) Inventors: Matthew J. Hennemann, Burlington, IA (US); Joseph R. Shoemaker, West Burlington, IA (US)

(73) Assignee: CNH Industrial America LLC, New Holland, PA (US)

( * ) Notice: Subject to any disclaimer, the term of this patent is extended or adjusted under 35 U.S.C. 154(b) by 990 days.

(21) Appl. No.: 12/908,899

(22) Filed: Oct. 21, 2010

(65) Prior Publication Data

US 2012/0096843 A1 Apr. 26, 2012

(51) Int. Cl.
*F16D 31/02* (2006.01)
*E02F 9/22* (2006.01)
*E02F 9/20* (2006.01)

(52) U.S. Cl.
CPC ............. *E02F 9/2228* (2013.01); *E02F 9/2235* (2013.01); *F15B 2211/50518* (2013.01); *E02F 9/2066* (2013.01); *F15B 2211/251* (2013.01); *F15B 2211/20553* (2013.01)
USPC .................................. 60/468; 60/443; 60/452

(58) Field of Classification Search
USPC ........... 60/459, 462, 463, 468, 494, 443, 444, 60/452
See application file for complete search history.

(56) References Cited

U.S. PATENT DOCUMENTS 4,184,331 A * 1/1980 Bentley ........................... 60/375
5,469,646 A 11/1995 Takamura
5,692,376 A * 12/1997 Miki et al. ...................... 60/445
6,385,519 B2 5/2002 Rocke
6,612,109 B2 9/2003 Mickelson
7,469,535 B2 12/2008 Sawada
7,483,814 B2 1/2009 Hoshi et al.
7,533,527 B2 5/2009 Naruse
2007/0227346 A1* 10/2007 Lehtinen ......................... 91/445
2008/0154466 A1 6/2008 Shenoy et al.
2008/0300757 A1 12/2008 Kanayama et al.
2010/0107622 A1* 5/2010 Hohensee ....................... 60/428
2011/0030363 A1* 2/2011 Lech et al. ...................... 60/445

FOREIGN PATENT DOCUMENTS

JP 2004190749 A 8/2004

* cited by examiner

*Primary Examiner* — Michael Leslie
(74) *Attorney, Agent, or Firm* — Patrick M. Sheldrake; Seyed V. Sharifi T.

(57) ABSTRACT

A work vehicle includes a fluid circuit to operate at least one implement for performing work, the fluid circuit having at least a first operating mode and a second operating mode. The first operating mode is configured to operate within a first predetermined flow rate range within a first predetermined fluid pressure level range. The second operating mode is configured to operate within a second predetermined flow rate range and within a second predetermined fluid pressure level range. In response to the fluid circuit operating within the second operating mode, a maximum pressure value of the second predetermined fluid pressure level range is greater than a maximum pressure value of the first predetermined fluid pressure level range, and a maximum value of the second predetermined flow level range is less than a maximum value of the first predetermined flow level range.

12 Claims, 6 Drawing Sheets

WORK VEHICLE LIFTING PERFORMANCE

FIELD OF THE INVENTION

The present invention relates generally to the field of work vehicles. It relates more particularly to work vehicles having a fluid system for manipulating attachments.

BACKGROUND OF THE INVENTION

Work vehicles, such as a loader backhoe, also referred to as a backhoe, are increasingly being used on job sites. Backhoes are typically not being used on job sites as primary excavation tools or tools for placing exceptionally heavy objects (2 tons or more), but as general utility machines.

While it may be desirable to increase work vehicle lifting performance, there are disadvantages associated with increasing lifting performance. For example, the motor associated with the work vehicle may need to be increased in operating capacity, i.e., size, but similarly results in increased weight and fuel consumption. Increased operating capacity in the form of a larger motor likely also requires components to have increased structural capacities. The increase in structural capacity, while not necessarily required when operating under nearly static loading conditions, would likely be required due to dynamic loading conditions. Increasing lifting performance in each situation would typically result in an increase in purchase price, weight, and operating costs (fuel). Further, the enhanced operating capacity may only be needed in a few instances, with a smaller work vehicle being capable of handling the vast majority of operating conditions associated without the increase in cost.

Accordingly, it would be advantageous to selectably increase lifting performance without the associated disadvantages.

SUMMARY OF THE INVENTION

The present invention relates to a work vehicle including a fluid circuit to operate at least one implement for performing work, the fluid circuit having at least a first operating mode and a second operating mode. The first operating mode is configured to operate within a first predetermined flow rate range within a first predetermined fluid pressure level range. The second operating mode is configured to operate within a second predetermined flow rate range and within a second predetermined fluid pressure level range. In response to the fluid circuit operating within the second operating mode, a maximum pressure value of the second predetermined fluid pressure level range is greater than a maximum pressure value of the first predetermined fluid pressure level range, and a maximum value of the second predetermined flow level range is less than a maximum value of the first predetermined flow level range.

The present invention further relates to a method for operating a work vehicle having a fluid circuit to operate at least one implement for performing work, the fluid circuit having at least a first operating mode and a second operating mode. The method includes selectably operating the work vehicle in the first operating mode, the first operating mode configured to operate within a first predetermined flow rate range and a first predetermined fluid pressure level range. The method further includes selectably operating the work vehicle in the second operating mode, the second operating mode configured to operate within a second predetermined flow rate range and within a second predetermined fluid pressure level range. A maximum value of the second predetermined fluid pressure level range is greater than a maximum value of the first predetermined fluid pressure level range, and a maximum value of the second predetermined flow level range is less than a maximum value of the first predetermined flow level range.

An advantage of the present invention is selectively improved lifting performance as needed by the operator in combination with greater control sensitivity.

A further advantage of the present invention is selectively improved lifting performance as needed by the operator in combination with reduced noise generation by the work vehicle.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
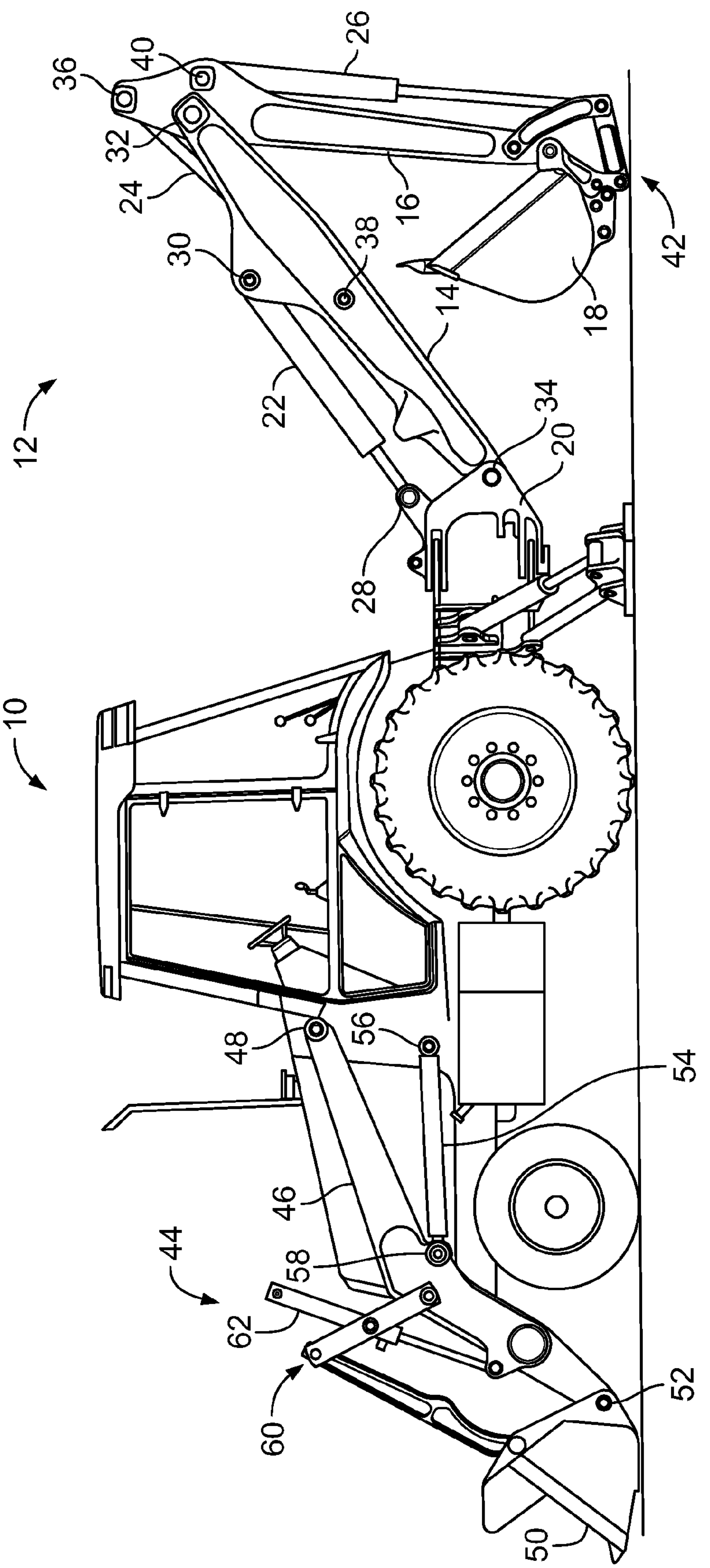
FIG. 1 is a side view of an embodiment of a work vehicle of the present invention.

Referring to the drawings for a description of an earthworking vehicle or machine 10 that employs the present invention, FIG. 1 shows a boom 14 in a lowered position. Boom 14 pivots about a pivot joint 34 and coincident pivot axis of a frame 20 and is controlled by extension/contraction of a fluid ram 22 connected between pivot joints 28, 30. Similarly, an arm 16, often referred to as a dipper, pivots about pivot joint 32 of boom 14 and is controlled by extension/contraction of fluid ram 24 connected between pivot joints 36, 38. In addition, attachment or implement 18, such as a bucket, is pivotably connected to arm 16 and is controlled by extension/contraction of a fluid ram 26 connected between pivot joint 40 and interconnected linkages 42. A backhoe 12 comprises the combination of boom 14, arm 16, implement 18 and pivoting connections therebetween.

As further shown in FIG. 1, opposite backhoe 12, vehicle or machine 10 includes a loader 44 having a pair of loader arms 46 pivoting about respective pivot joints 48. Only the left side is shown in FIG. 1. At the end of each of the loader arms 46 opposite to pivot joint 48, a bucket 50 pivots about pivot joints 52. A fluid ram 54 positioned between pivot joints 56, 58 controls the position of each loader arm 46 with respect to pivot joint 48. A fluid ram 62 is pivotably coupled to each of a pair of linkages 60 which pivotably interconnects each of a corresponding loader arm 46, fluid ram 62 and bucket 50. Fluid rams 62, in combination with linkage 60, control the position of bucket 50 with respect to pivot joints 52.

The disclosure is directed to selectably increase lifting performance of a work vehicle or machine in a manner that may not require enhanced structural capacities to lifting components associated with the vehicle or machine, due to a reduction in dynamic loading that is subjected to the lifting components.

Figure 2:
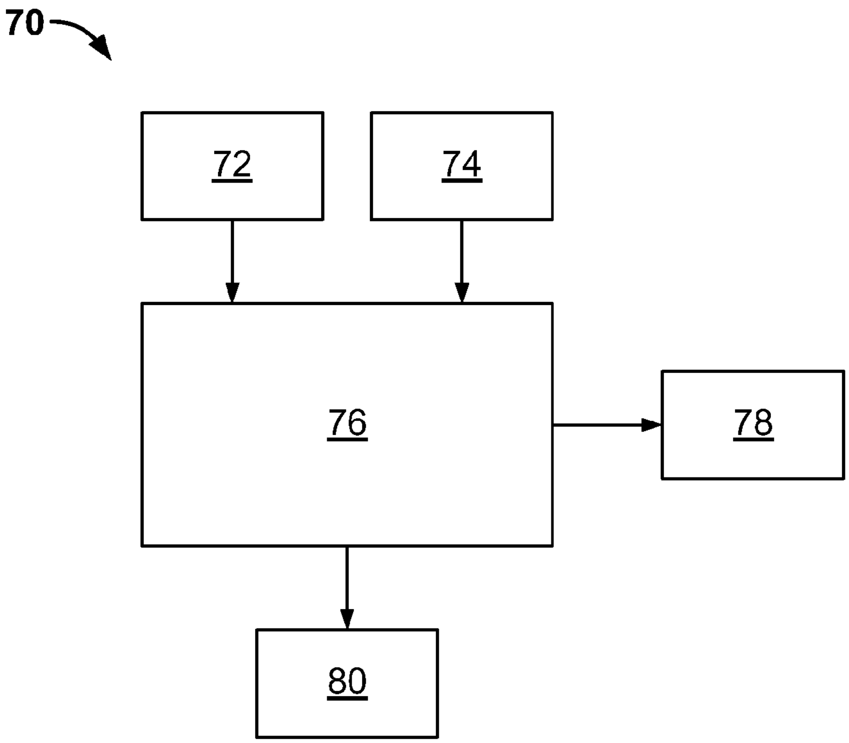
FIG. 2 is schematic diagram of an embodiment of a control system of the present invention.

FIG. 2 shows a control system 70 for use with a work vehicle or machine which includes a controller 76, typically a microprocessor or microprocessor controlled device. Controller 76 receives and manages inputs from an operator-enabled control 72, such as foot-operated or hand-operated motor speed throttle controls. In response to receiving input from operator-enabled control 72, controller 76 controls the speed of motor 80, within the operating parameters available to the controller. In special circumstances, such as when the work vehicle requires enhanced lifting capacity, sometimes referred to as "boost mode", the operator may actuate or enable a mode operations switch 74. In response to mode operations switch 74 being enabled, controller 76 reduces speed of motor 80, and activates the fluid circuit to operate in a different mode 78, an enhanced lift mode or boost mode, by increasing the fluid pressure in the fluid circuit. As a result of the fluid pressure in the fluid circuit being increased, the lifting capacity is enhanced or increased by a predetermined amount, such as by 10 percent in one embodiment. However, in other embodiments, the lifting capacity may be enhanced or increased by an amount different than 10 percent. Although the lifting capacity is enhanced, by virtue of increased fluid pressure in the fluid circuit, the fluid flow provided during the time of increased fluid pressure is simultaneously reduced. Once the special circumstance prompting the operator to enable mode operations switch 74 has been addressed, the operator may return the mode operations switch to its normal mode by moving or otherwise disabling mode operations switch 74 from its enhanced lift mode position, similarly disabling the enhanced lift mode capability in the corresponding fluid circuit.

Figure 3:
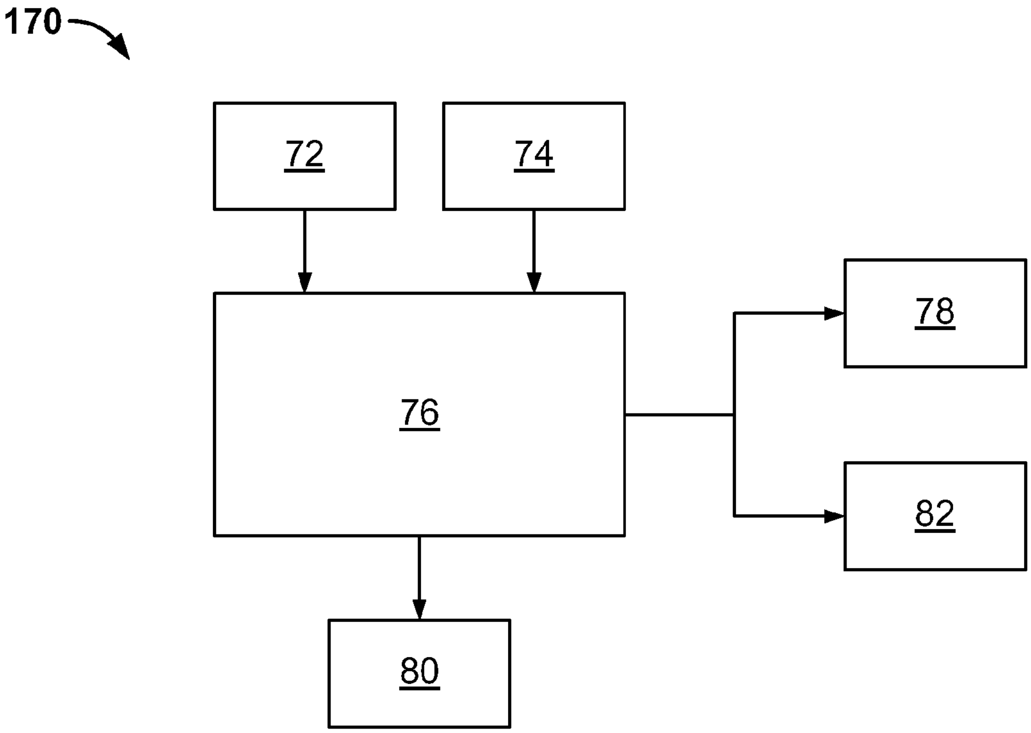
FIG. 3 is schematic diagram of an alternate embodiment of a control system of the present invention.

FIG. 3, shows a control system 170, which is similar to control system 70. With control system 170, in response to mode operations switch 74 being enabled, controller 76, in addition to reducing speed of motor 80, and activating the fluid circuit to operate in an enhanced lift mode, which increases the fluid pressure in the fluid circuit, further enables or activates a torque control mode for the fluid circuit pump.

There are significant advantages associated with employing a selectably actuated enhanced lift capability for a work machine or vehicle including, but not limited to the following: the ability to increase lifting and "breakout" specifications with little or no modifications to the structure because of reduced operating speeds; reduced costs because the structure does not have to be constructed to withstand a maximum system fluid pressure combined with the motor's maximum hydraulic flow; reduced power requirements, permitting a reduction in motor size (capacity); reduced power requirements, permitting fuel savings (temporary application of "boost mode"); improved controllability in the enhanced lift mode, due to reduced rate of fluid flow (increased sensitivity of operator-enabled controls 72); further improved controllability in the enhanced lift mode when torque control mode 82 is enabled on the fluid circuit pump; the ability for operator communication with support personnel (before and during a lift) that may be providing assistance by securing the objects to be lifted, due to reduced noise from the motor, cooling fan, etc. associated with reduced motor speed. Additionally, Applicant's laboratory testing has revealed that despite operating the work machine in an enhanced lift mode and at higher fluid pressures, due to the flow rate limitations imposed on the pump by the control systems described above, structural components are subjected to reduced stress and strain, resulting in less damage or "wear and tear" to the structural machine components during operation.

It is to be understood that the control systems as shown in FIGS. 2-3 include a configuration in which the controller automatically controls the operation of the motor, once the operator selects the operator-enabled controls. The control system may also be controlled using mechanical components, i.e., valves, as shown in FIGS. 4-8, to be further discussed below.

Figure 4:
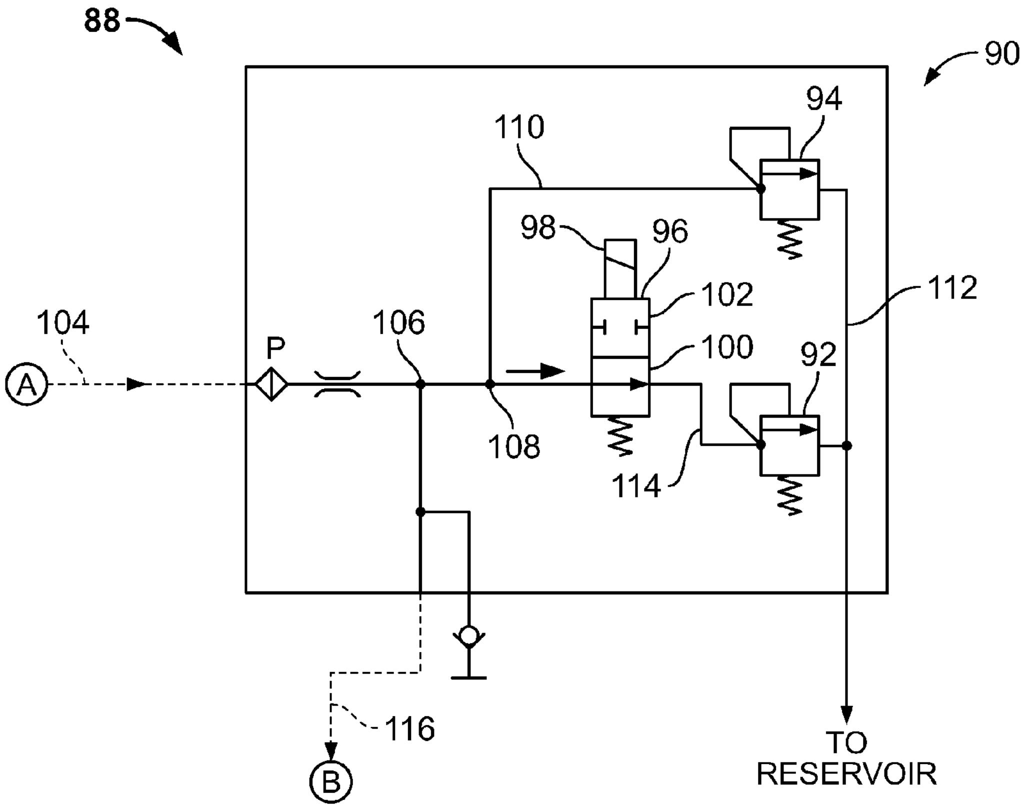
FIG. 4 is a schematic diagram of a first portion of a fluid system in a first operating mode (normal mode) of the present invention.
Figure 5:
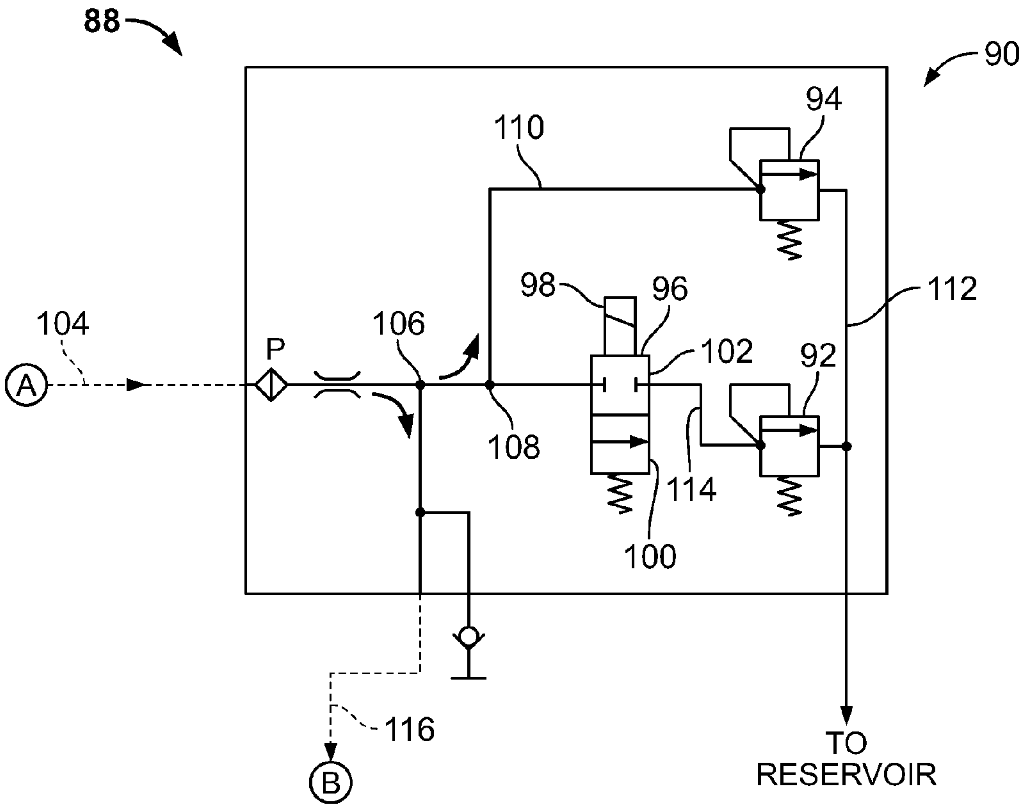
FIG. 5 is a schematic diagram of an alternative arrangement of a first portion of a fluid system, exhibiting a feature of a second operating mode (enhanced lift mode) of the present invention.

FIGS. 4-5 show a fluid circuit 88 and including a portion 90 of the fluid circuit. First portion 90 and second portion 120 (FIGS. 6-7) of the fluid circuit disclose an embodiment utilizing mechanical components, such as valves and the like to achieve the advantages of the disclosure. A line 104 (FIGS. 6-7) containing pressurized fluid from a pump 130 (FIGS. 6-7), sometimes referred to in the art as a load sense, encounters junctions 106, 108 in the fluid circuit. A first control valve 96, also referred to as a power lift valve, includes an open position 100 and a closed position 102. In one embodiment, first control valve 96 includes a solenoid 98 that is selectively controlled by the operator. In response to being actuated to open position 100 by the operator, pressurized fluid from line 104 passes through first control valve 96 along the line 114 to a first relief valve 92 that is in fluid communication with line 112 to the reservoir. An alternate path from junction 108 that bypasses first control valve 96 extends along line 110 to a second relief valve 94. First release valve 92 and second relief valve 94 are configured to have different predetermined pressure values associated with them. That is, a pressure value required to overcome a blocked position of first relief valve 92 is less than a pressure value required to overcome a blocked position of second relief valve 94. In other words, in response to first control valve 96 being in open position 100, once the pressure level in line 104 exceeds the pressure value required to overcome the blocked position of first relief valve 92, first relief valve 92 is actuated to an open position, thereby permitting the over-pressurized fluid to flow along line 112 to the reservoir, until the pressure level is reduced sufficiently so that the first relief valve returns to its blocked position. Stated another way, while first control valve 96 remains in the open position 100, the fluid pressure of fluid circuit 88 does not say exceed the "cracking pressure" of first relief valve 92.

However, as further shown FIG. 5, in response to first control valve 96 being controlled to move to closed position 102 by operator-controlled solenoid 98, pressurized fluid in line 104 bypasses the first control valve, traveling along line 110 to second relief valve 94. Since the pressure value required to overcome the blocked position of second relief valve 94 is greater than the pressure value required to overcome the blocked position of first relief valve 92, the pressure level in line 110 is permitted to increase until the pressure level exceeds the pressure value required to overcome the blocked position of the second relief valve, in a manner similarly described above for the first relief valve. However, since the "cracking pressure" of second relief valve 94 is greater than the "cracking pressure" of first relief valve 92, it is possible for the pressure level in line 110 to increase to the cracking pressure of the second relief valve. In one embodiment, the cracking pressure of the first relief valve corresponds to a pressure value of approximately 150 bar (2,350 psi), and the cracking pressure of the second relief valve corresponds to a pressure level of approximately 200 bar (3,100 psi). In that embodiment, for a particular model of a loader backhoe work vehicle, the 150 bar (2,350 psi) pressure level was intended to correspond to operation of the loader, while the pressure level of approximately 200 bar (3,100 psi) was intended to correspond to operation of the backhoe. In one embodiment, control of the position of first control valve 96 may include a switch (not shown) associated with the position of the seat of the work vehicle, the seat facing the backhoe or the loader, with the switch controlling the position of the first control valve. That is, in response to the seat facing the loader, first control valve 96 is urged to open position 100, and in response to the seat facing the backhoe, first control valve 96 is urged to closed position 102. In either position, pressurized fluid encountering junction 106 is in fluid communication with a line 116 which is further connected to a portion of the fluid circuit containing a second operating mode 120 as shown in FIGS. 6-7.

Figure 6:
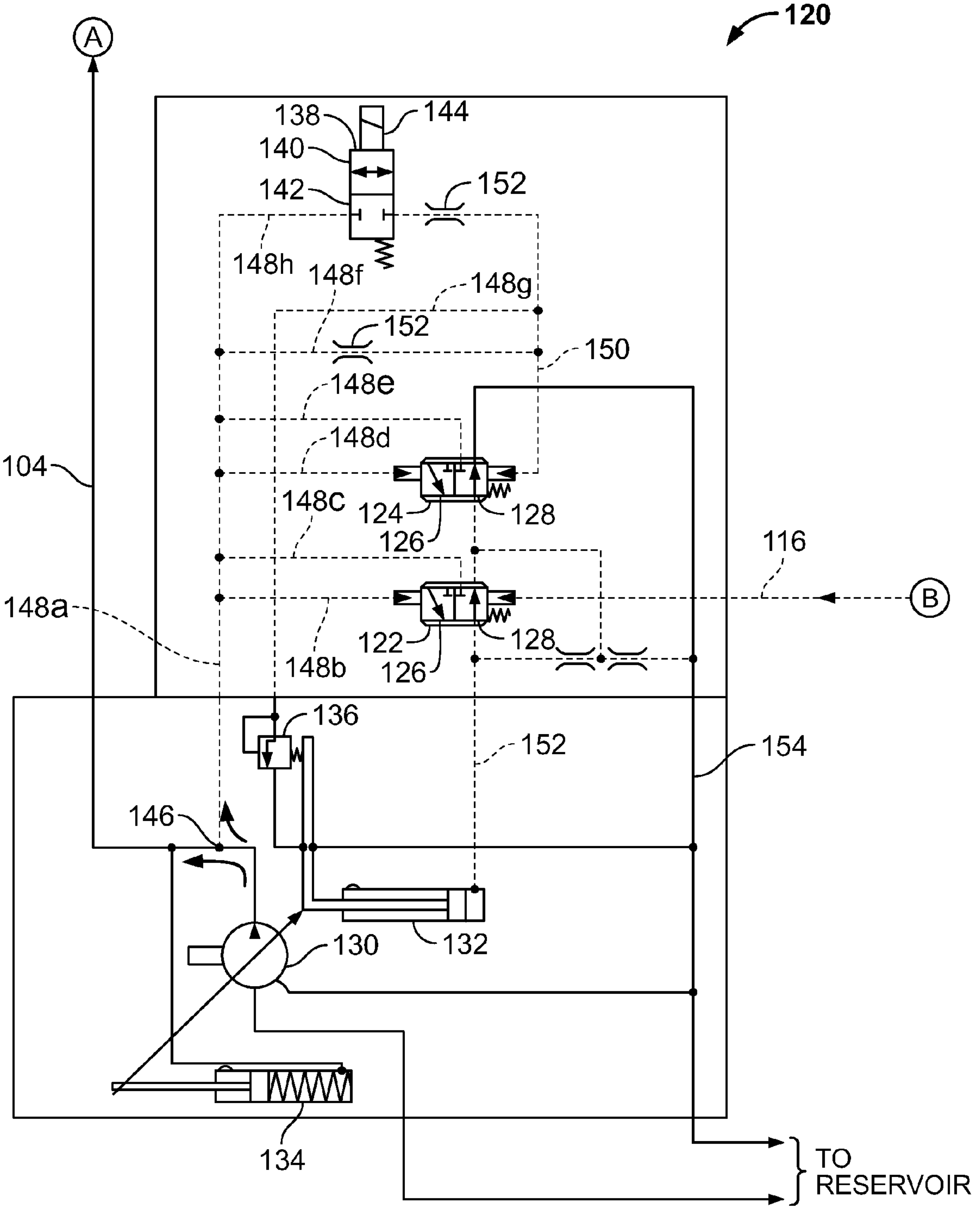
FIG. 6 is a schematic diagram of a second portion of a fluid system in a first operating mode (normal mode) of the present invention.
Figure 7:
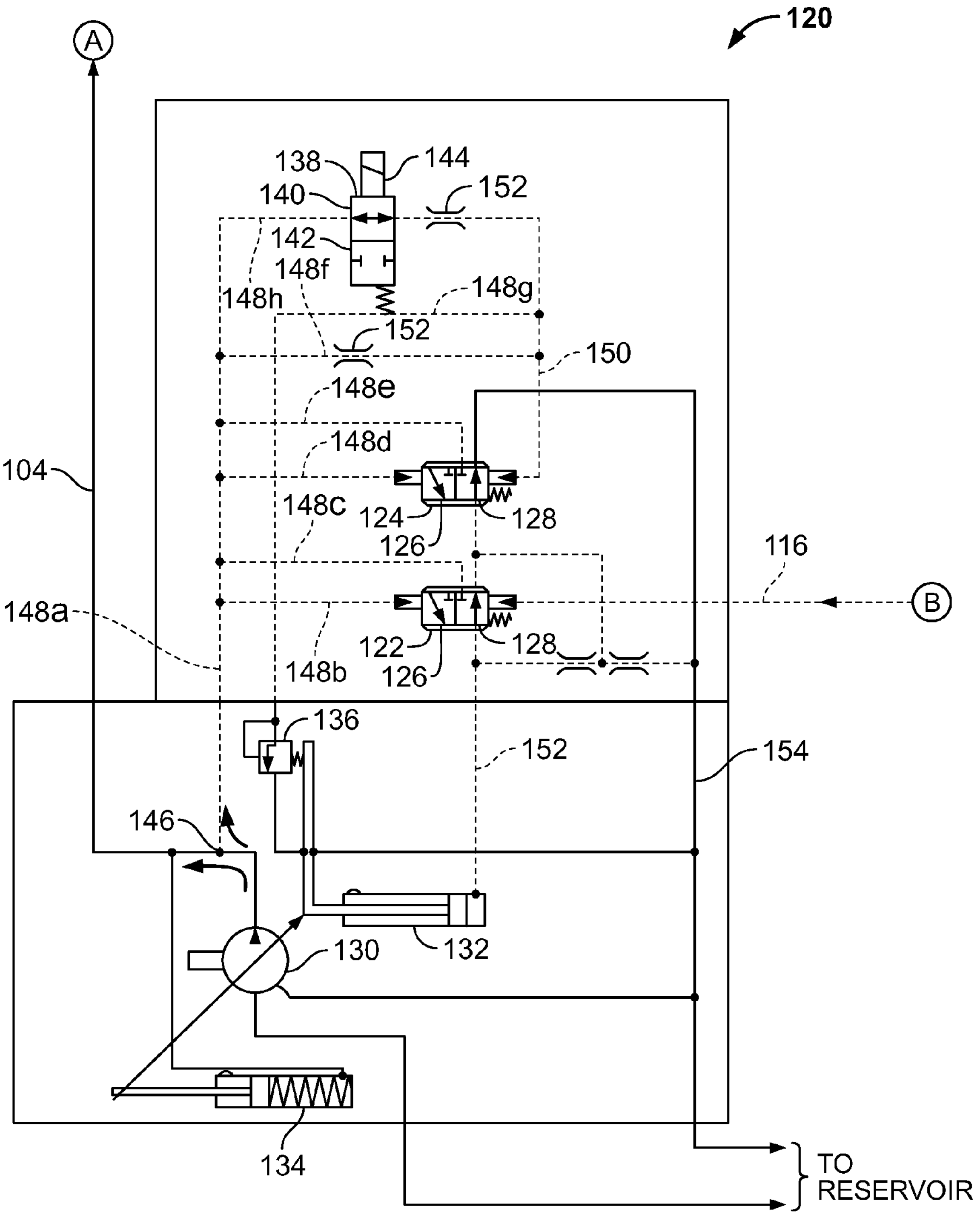
FIG. 7 is a schematic diagram of a second portion of a fluid system, exhibiting a feature of a second operating mode (torque control mode) of the present invention.

As shown in FIGS. 6-7, second portion 120 of the fluid circuit is in fluid communication with line 116 associated with the first portion 90 (FIGS. 4-5) of the fluid circuit. Second portion 120 includes a fluid pump 130 for pumping pressurized fluid in the fluid circuit, such as a variable displacement pump and may be part of an open center system or a closed center system. The output or displacement of fluid pump 130 is controlled by a first adjusting cylinder 132 in combination with an adjustable relief valve 136 and offset by a second adjusting cylinder 134. More specifically, the output of fluid pump 130 is related to the position of second adjusting cylinder 134, which when fully biased in one position, corresponds to maximum output of the fluid pump. However, first adjusting cylinder 132 in combination with adjustable relief valve 136 is configured to operate in opposition to second adjusting cylinder 134. Upon actuation of first adjusting cylinder 132 away from a position that corresponds to maximum output of the fluid pump, the output of the fluid pump is decreased, potentially to a position in which the fluid pump operates at a zero displacement or "stalled" position. Second portion 120 of the fluid circuit includes line 104 in fluid communication with pump 130 that leads to first portion 90 (FIGS. 4-5) of the fluid circuit, line 104 including a junction 146 in which line 104 is in fluid communication with interconnected lines 148*a*-148*g*. A delivery control valve 122 that is in fluid communication with line 148*b* and line 116 from first portion 90 (FIGS. 4-5) of the fluid circuit includes a loading position 126 and an unloading position 128. When delivery control valve 122 is urged toward loading position 126, pressurized fluid from line 148*c* is provided to a line 152 in fluid communication with first adjusting cylinder 132, biasing a piston in first adjusting cylinder 132 in a direction that results in a reduction of displacement of pump 130. Conversely, when delivery control valve 122 is urged toward unloading position 128, pressurized fluid flows through line 152 from first adjusting cylinder 132, biasing a piston in first adjusting cylinder 132 in a direction that results in an increase of displacement of pump 130.

A delivery control valve 124 that is in fluid communication with line 148*d* and a line 150 includes a loading position 126 and an unloading position 128. When delivery control valve 124 is urged toward loading position 126, pressurized fluid via line 148*e* is provided to delivery control valve 122, and when delivery control valve 122 is in loading position 126, pressurized fluid from line 148*e* in fluid communication with line 152 biases a piston in first adjusting cylinder 132 in a direction that results in a reduction of displacement of pump 130. Conversely, when delivery control valve 124 is urged toward unloading position 128, and when delivery control valve 122 is also in unloading position 128, pressurized fluid flows through lines 152, 154 from first adjusting cylinder 132 and through control valves 122, 124 to the reservoir, biasing a piston in first adjusting cylinder 132 in a direction that results in an increase of displacement of pump 130. Although alternate combinations of positions of control valves 122, 124 may occur during operation, they are not further discussed. Operation of the portion of pump 130 in combination with adjusting cylinders 132, 134 and delivery control valves 122, 124 and the associated interconnecting lines are disclosed in additional detail in U.S. Pat. No. 6,311,489, assigned to Brueninghaus Hydromatick GmbH, and is incorporated herein by reference.

Second portion 120 of the fluid circuit that is in fluid communication with lines 148*h*, 150 further includes a torque control valve 138 having an open position 140 and a closed position 142. As further shown in FIGS. 6-7, torque control valve 138 includes a solenoid 144 that is operator controlled. In response to an operator desiring to activate the fluid circuit in a second operating mode (torque control), the operator activates solenoid 144 to urge torque control valve 138 to open position 140. By virtue of torque control valve 138 being placed in open position 140, pressurized fluid in line 148*h* is in fluid communication with adjustable relief valve 136 via line 148*g* and delivery control valve 124 via line 150, resulting in a reduction in flow rate associated with increased pump pressure, making use of the relationship in which torque is the product of fluid pressure and fluid displacement. That is, for constant torque, an increase in fluid pressure would require a decrease in fluid flow rate.

Figure 8:
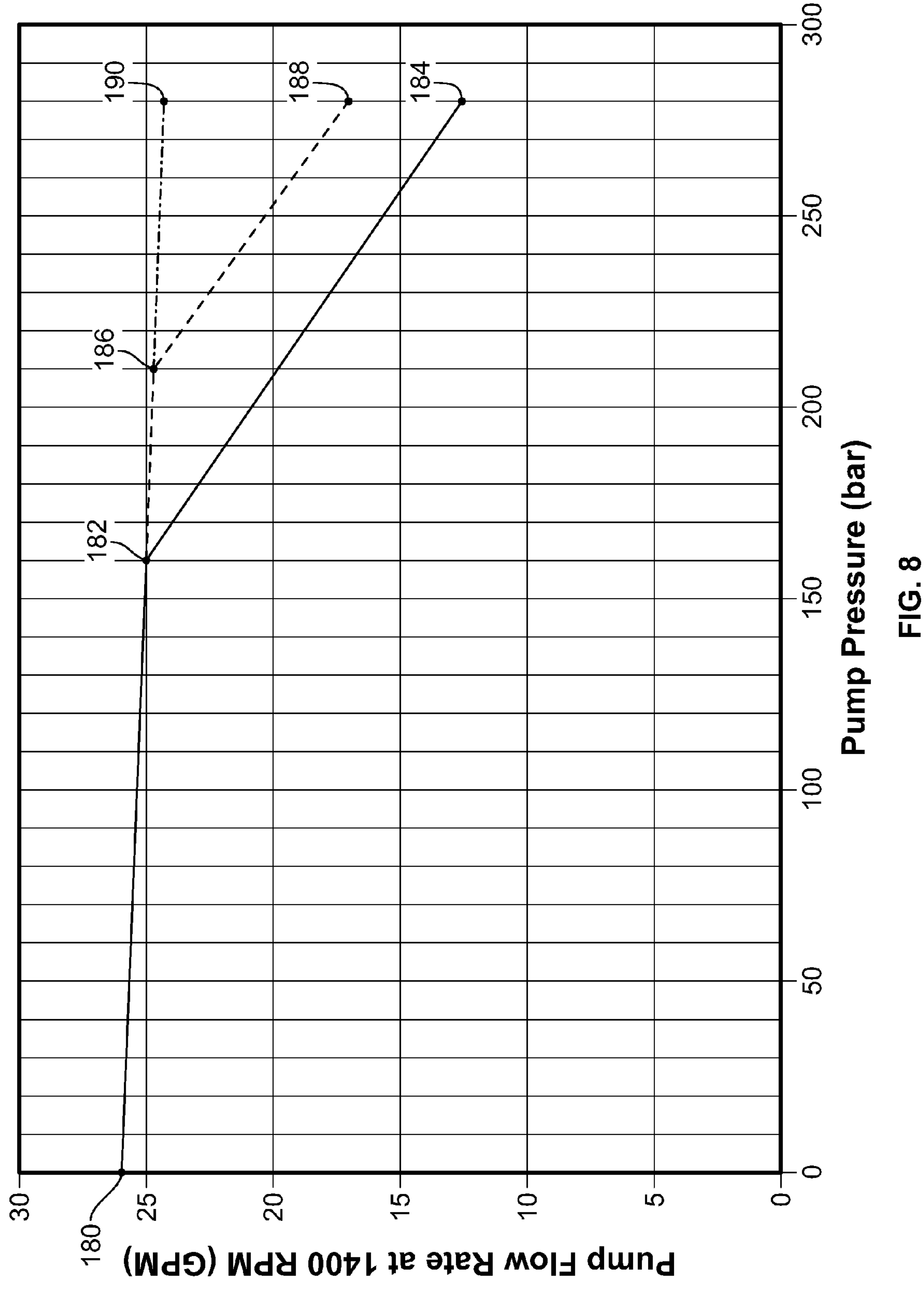
FIG. 8 is a graph showing pressure (X-axis) versus fluid flow rate (Y-axis) for an exemplary embodiment of a work machine operating at a fixed rpm in the operating modes of the present invention.

FIG. 8 shows a graphical representation of pump pressure (X-axis) versus pump flow rate corresponding to a fixed motor speed of 1400 rpm, of one embodiment of a loader-backhoe utilizing a first (normal) operating mode and second (enhanced lift/torque control) operating mode as discussed above. The information shown in FIG. 8 will be discussed in terms of line segments. The line segment extending between point 180 and point 190 corresponds to operation of the pump with torque control valve 138 maintained in an open position 140. With respect to the first operating mode (FIGS. 4-5), in which first control valve 96 is maintained in open position 100, and corresponding to operation of the loader, is shown as line segment extending between point 180 and point 182. Point 182 corresponds to a fluid pressure of approximately 160 bar (2,350 psi) at a fluid flow rate of approximately 25 gpm. Line segment extending between point 182 to point 184 corresponds to operation of the loader in the second operating mode (FIGS. 7-8) in which the operator has activated solenoid 144 to urge torque control valve 138 to an open position 140. As further shown in FIG. 8, the operator now operates the loader in an enhanced lift mode, the pressure level increasing from approximately 160 bar (2,350 psi) to approximately 280 bar (3,450 psi). However, the available flow rate decreases from approximately 25 gpm to approximately 12.5 gpm. The reduction in flow rate translates to greater operator control, in that the controls are more sensitive, as an additional amount of movement of the operator control, for example, a joystick control, is required to obtain a previously similar amount of loader movement, due to the reduced flow rate of fluid.

Further with respect to the first operating mode (FIGS. 4-5), in which first control valve 96 is urged to closed position 102, and corresponding to operation of the backhoe, is shown as line segment extending between point 182 and point 186.

Point 186 corresponds to a pressure of approximately 210 bar (3,100 psi) at slightly less than 25 gpm. Line segment extending between point 186 to point 188 corresponds to operation of the backhoe in the second operating mode (FIGS. 7-8) in which the operator has activated solenoid 144 to urge torque control valve 138 to an open position 140. As further shown in FIG. 8, the operator now operates the loader in an enhanced lift mode, the pressure level increasing from approximately 210 bar (3,100 psi) to approximately 280 bar (3,450 psi). However, the available flow rate decreases from slightly less than 25 gpm to approximately 17 gpm. The reduction in flow rate translates to greater operator control, in that the controls are more sensitive, as an additional amount of backhoe movement of the operator control, for example, a joystick control, is required to obtain a previously similar amount of movement, due to the reduced flow rate of fluid.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A work vehicle comprising:

a fluid circuit to operate at least one implement for performing work, the fluid circuit having at least a first operating mode and a second operating mode;

the first operating mode configured to operate within a first predetermined flow rate range within a first predetermined fluid pressure level range; and the second operating mode configured to operate within a second predetermined flow rate range and within a second predetermined fluid pressure level range;

wherein in response to the fluid circuit operating within the second operating mode, a maximum pressure value of the second predetermined fluid pressure level range is greater than a maximum pressure value of the first predetermined fluid pressure level range, and a maximum value of the second predetermined flow level range is less than a maximum value of the first predetermined flow level range; and wherein the second operating mode comprises at least a first relief valve and a second relief valve;

wherein the operating modes comprise a first control valve to selectably control flow to the first relief valve; and wherein in response to the first control valve being urged to a closed position, the maximum value of the first predetermined flow level range is increased to the pressure value required to overcome the blocked position of the second relief valve and the first predetermined flow level range corresponds to operation of a loader of the work vehicle, and the second predetermined flow level range corresponds to operation of a backhoe of the work vehicle.

2. The work vehicle claim 1, wherein the first operating mode comprises a first relief valve.

3. The work vehicle of claim 1, wherein the first control valve is selectably controlled by a solenoid.

4. The work vehicle of claim 1, wherein a pressure value required to overcome a blocked position of the first relief valve is less than a pressure value required to overcome a blocked position of the second relief valve.

5. The work vehicle of claim 1 comprises a switch associated with a position of the seat of the work vehicle, the seat facing the backhoe or the loader, the switch controlling the position of the first control valve.

6. A work vehicle comprising:

a fluid circuit to operate at least one implement for performing work, the fluid circuit having at least a first operating mode and a second operating mode;

the first operating mode configured to operate within a first predetermined flow rate range within a first predetermined fluid pressure level range; and the second operating mode configured to operate within a second predetermined flow rate range and within a second predetermined fluid pressure level range;

wherein in response to the fluid circuit operating within the second operating Mode, a maximum pressure value of the second predetermined fluid pressure level range is greater than a maximum pressure value of the first predetermined fluid pressure level range and a maximum value of the second predetermined flow level range is less than a maximum value of the first predetermined flow level range; wherein the second operating mode comprises at least a first valve and a second valve, wherein the operating mode comprise a first control valve a selectably control flow to the first relief valve and the second operating mode comprises enabling a torque control valve in fluid communication with a pressurized fluid.

7. The work vehicle of claim 6, wherein the torque control valve includes a solenoid.

8. The work vehicle of claim 6, wherein the fluid pump is a variable displacement pump.

9. A method for operating a work vehicle having a fluid circuit to operate at least one implement for performing work, the fluid circuit having at least a first operating mode and a second operating mode, the method comprising:

selectably operating the work vehicle in the first operating mode, the first operating mode configured to operate within a first predetermined flow rate range and a first predetermined fluid pressure level range; and selectably operating the work vehicle in the second operating mode, the second operating mode configured to operate within a second predetermined flow rate range and within a second predetermined fluid pressure level range, wherein a maximum value of the second predetermined fluid pressure level range is greater than a maximum value of the first predetermined fluid pressure level range, and a maximum value of the second predetermined flow level range is less than a maximum value of the first predetermined flow level range; and wherein selectably operating the work vehicle in each of the operating modes includes selectably controlling a first control valve to separate the first predetermined fluid pressure level range and the second fluid pressure level range that is greater than the first fluid pressure level range; and wherein the first control valve comprises a switch associated with the position of the seat of the work vehicle, the seat facing the backhoe or the loader, the switch controlling the position of the first control valve.

10. A method for operating a work vehicle having a fluid circuit to operate at least one implement for performing work, the fluid circuit having least a first operating mode and a second operating mode, the method comprising:

selectably operating the work vehicle in the first operating mode, the first operating mode configured to operate within a first predetermined flow rate range and a first predetermined fluid pressure level range; and selectably operating the work vehicle in the second operating mode, the second operating mode configured to operate within a second predetermined flow rate range and within a second predetermined fluid pressure level range, wherein a maximum value of the second predetermined fluid pressure level range is greater than a maximum value of the first predetermined fluid pressure level range and a maximum value of the second predetermined flow level range is less than a maximum value of the first predetermined flow level range; wherein selectably operating the work vehicle in each of the operating modes includes seletably controlling a first control valve to separate the first predetermined fluid pressure level range and the second fluid pressure level range that is greater than the first fluid pressure level range; and wherein the first control valve is controlled by a switch, the switch controlling the position of the first control valve wherein the second operating mode comprises enabling a torque control valve in fluid communication with a pressurized fluid pump.

11. The method of claim 10, wherein the pump is a variable displacement pump.

12. A work vehicle comprising:

a fluid circuit to operate at least one implement for performing work, the fluid circuit having at least a first operating mode and a second operating mode;

the first operating mode configured to operate within a first predetermined flow rate range within a first predetermined fluid pressure level range; and the second operating mode configured to operate within a second predetermined flow rate range and within a second predetermined fluid pressure level range;

wherein in response to the fluid circuit operating within the second operating mode, a maximum pressure value of the second predetermined fluid pressure level range is greater than a maximum pressure value of the first predetermined fluid pressure level range, and a maximum value of the second predetermined flow level range is less than a maximum value of the first predetermined flow level range; wherein the second operating mode comprises at least a first valve and a second valve, wherein the operating modes comprise a first control valve to selectably control flow to the first relief valve and wherein the operating modes of the fluid circuit are controlled by at least a controller operatively connected to a motor of the vehicle and configured to operate in the second operating mode by reducing the speed of motor and by increasing the fluid pressure in the fluid circuit.

* * * * *